Feb. 26, 1924.                                              1,484,619
                        E. J. BLAKE
              METHOD OF CHARGING PERMANENT MAGNETS
                    Filed May 22, 1919
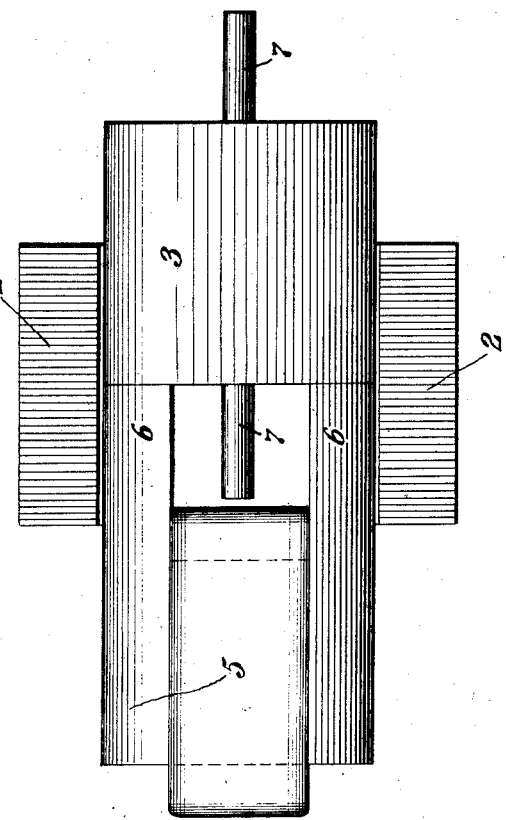
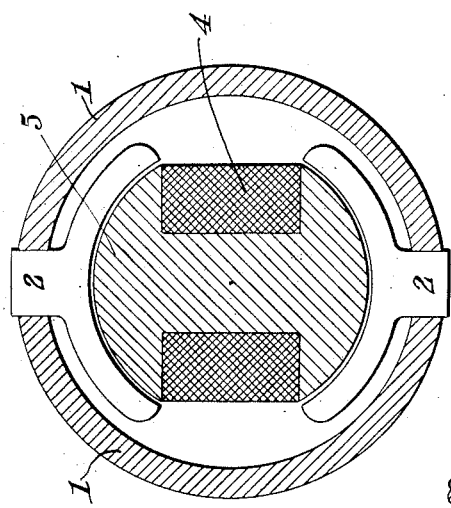
INVENTOR
Eli J. Blake
BY
Kenyon & Kenyon
        ATTORNEYS Patented Feb. 26, 1924.

1,484,619

UNITED STATES PATENT OFFICE.

ELI J. BLAKE, OF BUFFALO, NEW YORK, ASSIGNOR TO GOULD COUPLER COMPANY, A CORPORATION OF NEW YORK.

METHOD OF CHARGING PERMANENT MAGNETS.

Application filed May 22, 1919. Serial No. 298,848.

*To all whom it may concern:*

Be it known that I, ELI J. BLAKE, a citizen of the United States, and residing at Buffalo, county of Erie, State of New York, and whose post-office address is care of Gould Coupler Company, Depew, New York, have invented certain new and useful Improvements in Methods of Charging Permanent Magnets, of which the following is a specification.

My invention relates to a method of charging permanent magnets such as are used in magneto generators. An object of my invention is to charge and utilize such permanent magnets in such a manner that they will retain a larger useful magnetization than has been accomplished heretofore.

When an electric current traverses a coil linked with a closed or nearly closed magnetic circuit of steel, a certain magnetic flux is set up in the steel circuit. If now the current in the coil is discontinued, a large part of the magnetic flux will persist so long as the magnetic circuit remains intact; but if the magnetic circuit is interrupted, even momentarily, the residual flux falls to a much lower value, and cannot be restored by re-closing the interrupted magnetic circuit.

In one method heretofore employed for charging the permanent magnets of magneto generators, the magnetic circuit during charge consists of the permanent magnet to be charged and an electromagnet bridging the poles of the permanent magnet. When the electromagnet is energized, a magnetic flux is established through the electromagnet core and the permanent magnet. If the electromagnet is then deenergized the magnetic flux tends to persist in the circuit, and especially in the permanent magnet which is made from magnetically retentive material. After charging, the permanent magnet is separated from the electromagnet and assembled with the other parts of the magneto generator which constitute another magnetic path between the permanent magnet poles. But during the transfer from the first magnetic circuit comprising the electromagnet to the magnetic path comprising parts of the magneto generator, the magnetic circuit through the permanent magnet is interrupted, and the flux in the magnet is thereby permanently reduced.

My invention consists in establishing a magnetic circuit through the permanent magnet to be charged and a source of magnetomotive force, and thereafter maintaining between the permanent magnet poles a path of low reluctance while the magnet is transferred from the source of magnetomotive force to the path with which it is to be associated in normal operation. Since the magnetic circuit is not interrupted after charging the permanent magnet the latter retains the maximum flux which it is capable of maintaining in the magnetic circuit in which it is included in operation.

My invention is particularly applicable to the charging of permanent magnets for magneto generators and in the drawings attached hereto I have illustrated diagrammatically means for carrying out the method constituting my invention. Referring to the drawings:

Fig. 1 is a transverse section through a magneto stator structure with its permanent magnets and a charging magnet therein.

Fig. 2 is a longitudinal section through the center of the magneto poles, showing the rotor in process of being substituted for the charging magnet.

Referring to Figure 1, 1 are the permanent magnets, 2 are pole pieces; 4 and 5 respectively are the winding and core of a charging electromagnet.

In Fig. 2 the poles of the electromagnet core 5 are shown extended at 6 overhanging the shaft 7 of a rotor 3 of the magneto.

My method of charging the permanent magnets for magnetos, in its preferred form, is carried out as follows:

The permanent magnets are assembled in their normal position in the magneto stator. The electromagnet 4, 5, 6 is inserted between the poles in place of the rotor. The permanent magnets are then charged or magnetized by energizing the electromagnet. The rotor 3 is now placed against the extended poles 6 of the electromagnet, and is caused to follow the electromagnet through as the latter is withdrawn. Fig. 2 shows the rotor being inserted between the stator poles from the right, while the electromagnet is withdrawn toward the left. When the rotor reaches its normal position the electromagnet is clear of the poles, and is removed. Thus the magnetic path through the rotor is established simultaneously with the removal of the electromagnet. The continuity of the low reluctance magnetic circuit through the permanent magnets is never interrupted, and the magnetic flux retained is much larger than it would be if the circuit were interrupted, or if its reluctance were substantially increased, between the charging process and the final assembly of the magneto.

Obviously the method may be carried out in many different ways while at the same time the principal advantages thereof would be secured. I, therefore, desire not to be limited to the exact method or means described but intend that the appended claims shall cover my invention broadly, however carried out.

Having described my invention, what I claim as new and desire to secure by Letters Patent is:

1. The method of magnetizing the permanent field magnets of a magneto-generator, which consists in substituting an electromagnetic core for the rotor core, impressing a magneto-motive force on the field circuit through said electro-magnetic core and displacing the electromagnetic core by the rotor core, in such a manner as to maintain the continuity of the magnetic circuit of the magneto-generator.

2. The method of magnetizing the permanent field magnets of a partially assembled magneto-generator, which consists in so positioning electro-magnetic means with respect to said field magnets as to enable the charging of the latter by the former, impressing a magneto-motive force on the field circuit through said electro-magnetic means, and thereafter placing the rotor of the magneto-generator in position while removing said electro-magnetic means in such manner as to maintain a continuous magnetic path for the field magnets.

3. The method of charging the permanent magnets of a partially assembled magneto generator, which consists in introducing an electromagnet between the poles, exciting the electromagnet to charge the permanent magnets, and thereafter substituting the rotor of the magneto generator for the electromagnet while in juxtaposition with said electromagnet, so as to maintain a continuous magnetic path between the poles of the permanent magnets during the substitution.

4. The method of magnetizing the permanent magnets of a partially assembled magneto-generator, which consists in placing in the rotor space an electromagnet conforming to the pole bore, charging the permanent magnets by exciting the electromagnet, and thereafter inserting the rotor from one end while withdrawing the electromagnet from the other, the poles of the electromagnet being extended to constitute a continuous magnetic circuit for the permanent magnets during the substitution of the rotor for the electromagnet.

5. The method which consists in placing the rotor of a magneto-generator in position in the generator after the permanent magnets are in place and magnetized, while maintaining a continuous magnetic path for the permanent magnets.

6. The method which consists in assembling the permanent magnets of a magneto-generator with their supporting structure, charging said magnets in position while the rotor of the generator is out and maintaining a continuous magnetic circuit for said magnets until the rotor is placed in position in the generator.

7. The method which consists in magnetizing the permanent magnet of a magneto-generator and then inserting the rotor of the magneto-generator in operative position with respect to said permanent magnet while maintaining a path of low reluctance between the poles of said permanent magnet.

In testimony whereof, I have signed my name to this specification.

ELI J. BLAKE.